Oct. 21, 1952    J. M. ARCHAMBAULT    2,614,508
RAILWAY VEHICLE AXLE MOUNTING
Filed April 13, 1946    2 SHEETS—SHEET 1
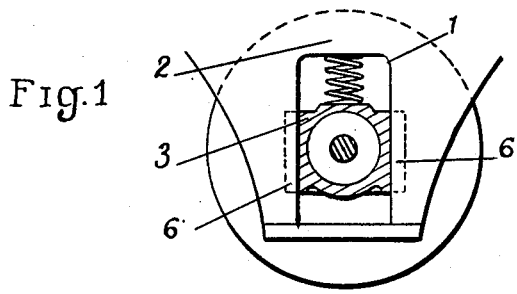
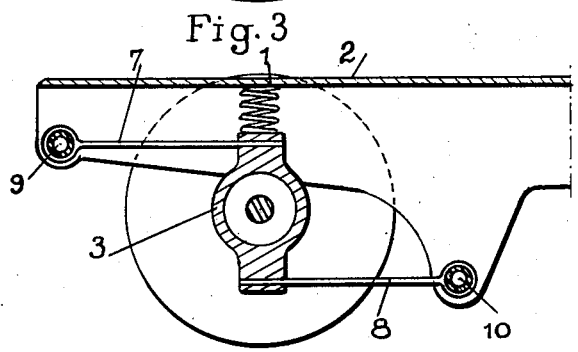
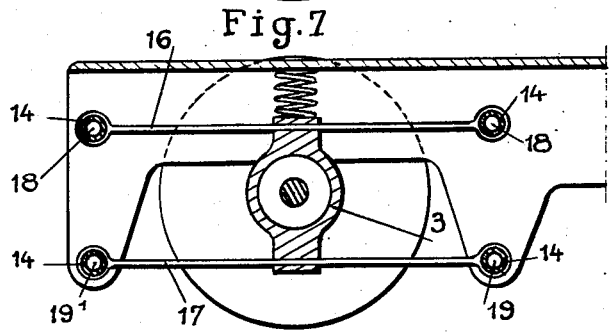
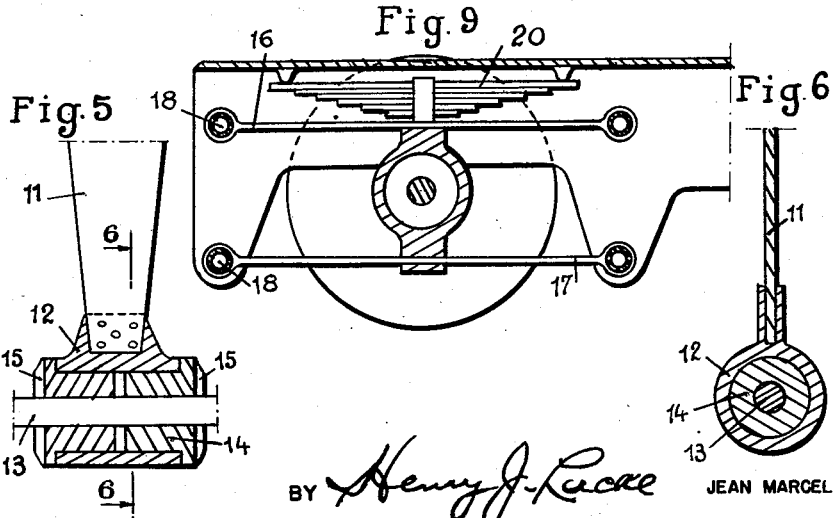
INVENTOR
JEAN MARCEL ARCHAMBAULT
BY Henry J. Lucke
ATTORNEY Oct. 21, 1952      J. M. ARCHAMBAULT      2,614,508
RAILWAY VEHICLE AXLE MOUNTING Filed April 13, 1946      2 SHEETS—SHEET 2

INVENTOR
JEAN MARCEL ARCHAMBAULT
BY Henry J. Lucke
ATTORNEY

Patented Oct. 21, 1952

2,614,508

UNITED STATES PATENT OFFICE 2,614,508

RAILWAY VEHICLE AXLE MOUNTING

Jean Marcel Archambault, Asnieres, France

Application April 13, 1946, Serial No. 661,930
In France August 19, 1943

2 Claims. (Cl. 105—224)

1

The present invention relates to devices for elastically holding the axles or axle boxes of railway vehicles.

One of the suspension arrangements that are usually employed on railway vehicles includes, as illustrated by Fig. 1, a helical spring 1, interposed between the longitudinal member 2 of the vehicle body or truck and the axle or axle box 3.

This suspension may also, as shown by Fig. 2, include two springs such as 4, located on either side of the axle box 3 but still interposed between extensions of this axle box and the longitudinal member 2 of the vehicle body or truck.

As a rule, these springs are generally insufficient for resisting by themselves the action of the driving efforts and of the lateral shocks exerted on the axle and these shocks are commonly transmitted to the frame through slideways such as 6, which require expensive lubrication and taking up of the play.

Furthermore, the shocks are transmitted directly to the body without being in any way absorbed.

The object of my invention is to provide an elastic connecting device between suspended and unsuspended parts of a railway vehicle which obviates these drawbacks.

Preferred embodiments of my invention will be hereinafter described with reference to the accompanying drawings, given merely by way of example, and in which:

Figs. 1 and 2 are explanatory views showing conventional suspension devices such as used at the present time;

Figs. 3 and 4 are views of axles analogous to those of Figs. 1 and 2 respectively, but provided with a holding device according to my invention;

Figure 4:
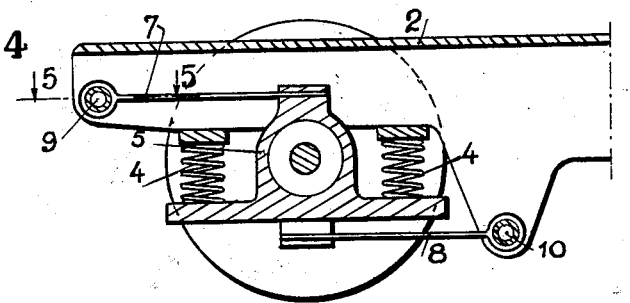
Figure 8:
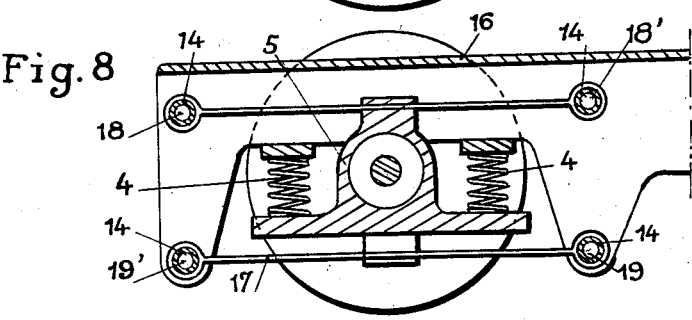
Figure 10:
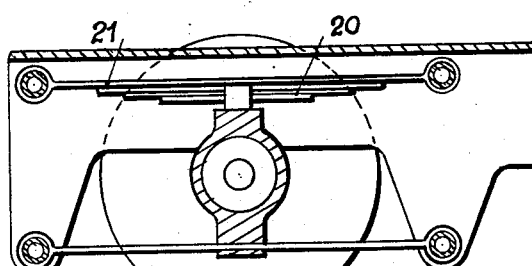
Figure 11:
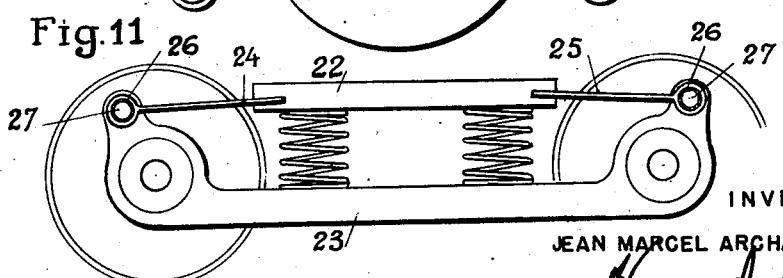

Figs. 5 and 6 art part sectional views respectively on the lines 5—5 of Fig. 4 and 6—6 of Fig. 5;

Figs. 7 and 8 show modifications of the devices of Figs. 3 and 4 intended to improve the stability of the whole;

Figs. 9 and 10 are two other modifications corresponding respectively to Figs. 7 and 8;

Fig. 11 illustrates the application of the invention to the holding of a body suspension supporting piece on a truck longitudinal member.

In the embodiment of Fig. 3, the upper portion and the lower portion of axle box 3 are provided with tie rods 7 and 8 fixed thereto. These tie rods are constituted by steel bands rigidly fixed at one of their ends to respective fixation points 9, 10 of the vehicle frame.

By way of example, each of these tie rods is constituted, as shown by Figs. 5 and 6, by a flat steel strip 11, secured, for instance by means of rivets, to a collar 12 mounted on driving spindle 13 through the intermediary of a rubber filling 14, kept under pressure by bearing plates 15.

In the position shown by Fig. 3, the vehicle frame 2 is supported by spring 1, interposed between said frame and axle box 3, in a position such that when a normal static load is applied to said frame 2, the flat faces of spring strips 7 and 8 are substantially horizontal.

This arrangement permits both of elastically transmitting longitudinal and transverse efforts and of permitting the necessary vertical displacements of the axles. It does not require any upkeep or lubrication and partly absorbs the shocks supported by the wheels.

Figure 2:
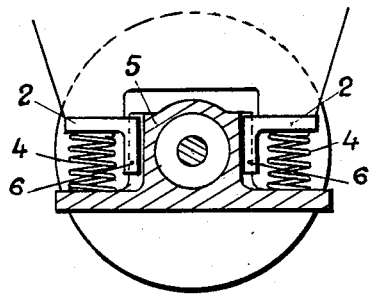

When there are two suspension springs such as 4 in the embodiment of Fig. 2, the arrangement may be that of Fig. 4, on which the same reference characters designate the same elements.

In order to increase the stability of the device, I may make use of the arrangement of Figs. 7 and 8, in which the tie rods are constituted by double bands 16, 17, each fixed in its middle part to the axle box 3 or 5 and respectively secured to spindles 18, 18' and 19, 19' through the intermediary of bushing 14 of a suitable material such as rubber.

In the embodiment of Fig. 9, which shows the application of the invention to the case in which the helical spring 1 of Figs. 3 and 7 is replaced by a leaf spring 20, the tie rods are secured in the same manner as in the embodiment of Fig. 7.

I may also, as shown by Fig. 10, utilize as tie rod the main leaf 21 of the suspension leaf spring 20.

In the application of Fig. 11, the body of the vehicle (not shown on the drawing) is supported by a piece 22 suspended on the longitudinal member 23 of a truck. According to my invention, this piece is held in position by tie rods 24, 25 themselves fixed, with the interposition of blocks 26, for instance of rubber, on spindles 27 rigid with the longitudinal member 23 of the truck.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a railway vehicle including a body, a pair of wheels, an axle carried by said pair of wheels and spring means for suspending said body on said axle, said spring means comprising at least one main spring interposed between said body and said axle for holding said body in a predetermined position with respect to said axle when said body is subjected only to the static action of a normal load, at least two flat spring strips having their flat faces substantially horizontal in said loading conditions, said spring strips having each one part thereof rigidly secured to said axle at different levels and extending at right angles to said axle, a spindle parallel to said axle rigid with said body and located on one side of the vertical plane of the axes of said wheels at the level of one of said strips, a spindle parallel to said axle rigid with said body and located on the other side of said vertical plane at the level of the other strip, collars carried by the ends of said strips, in the form of cylindrical surfaces having their generatrices parallel to said axle, said collars surrounding said spindles respectively and tubular rubber sleeves compressed between said collars and said spindles respectively so as to adhere by their inner surfaces against said spindles and by their outer surfaces against said collars.

2. In a railway vehicle including a body, a pair of wheels, an axle carried by said pair of wheels and spring means for suspending said body on said axle, said spring means comprising at least one main spring interposed between said body and said axle for holding said body in a predetermined position with respect to said axle when said body is subjected only to the static action of a normal load, at least two superposed flat spring strips of equal lengths having their flat faces substantially horizontal in said loading conditions, said strips having each the intermediate part thereof rigidly secured to said axle and extending at right angles thereto on either side thereof, collars respectively carried by the ends of said spring strips, in the form of cylindrical surfaces having their generatrices parallel to said axle, spindles parallel to said axle rigid with said body and extending in said collars respectively, and tubular rubber sleeves compressed between said collars and said spindles respectively so as to adhere by their inner surfaces against said spindles and by their outer surfaces against said collars.

JEAN MARCEL ARCHAMBAULT.

REFERENCES CITED

The following references are of record in the file of this patent:

UNITED STATES PATENTS

| Number | Name | Date |
|---|---|---|
| 1,485,224 | Hamilton | Feb. 26, 1924 |
| 1,701,558 | Drenning | Feb. 12, 1929 |
| 2,211,647 | Collier | Aug. 13, 1940 |
| 2,258,663 | Travilla et al. | Oct. 14, 1941 |
| 2,372,380 | Jabelmann | Mar. 27, 1945 |

FOREIGN PATENTS

| Number | Country | Date |
|---|---|---|
| 825,955 | France | Dec. 27, 1937 |